United States Patent
Pandit

(10) Patent No.: US 9,483,284 B2
(45) Date of Patent: Nov. 1, 2016

(54) VERSION COMPATIBILITY DETERMINATION

(75) Inventor: Rakesh Pandit, Jammu (IN)

(73) Assignee: Red Hat, Inc., Raleigh, NC (US)

( * ) Notice: Subject to any disclaimer, the term of this patent is extended or adjusted under 35 U.S.C. 154(b) by 303 days.

(21) Appl. No.: 13/035,053

(22) Filed: Feb. 25, 2011

(65) Prior Publication Data

US 2012/0222025 A1 Aug. 30, 2012

(51) Int. Cl.
*G06F 9/45* (2006.01)
*G06F 9/445* (2006.01)
*G06F 9/44* (2006.01)

(52) U.S. Cl.
CPC ............. *G06F 9/44552* (2013.01); *G06F 8/68* (2013.01)

(58) Field of Classification Search
USPC .......................................................... 717/170
See application file for complete search history.

(56) References Cited

U.S. PATENT DOCUMENTS

| | | | |
|---|---|---|---|
| 5,490,249 A | 2/1996 | Miller | |
| 5,634,114 A * | 5/1997 | Shipley | ........................ 717/170 |
| 5,652,835 A | 7/1997 | Miller | |
| 5,684,952 A * | 11/1997 | Stein | .............................. 709/221 |
| 5,933,642 A | 8/1999 | Greenbaum et al. | |
| 6,195,528 B1 * | 2/2001 | Young | ...................... G09B 5/02 434/118 |
| 6,480,851 B1 * | 11/2002 | Terek | ................. G06F 17/30067 707/812 |
| 6,862,696 B1 | 3/2005 | Voas et al. | |
| 7,003,560 B1 | 2/2006 | Mullen et al. | |
| 7,150,008 B2 | 12/2006 | Cwalina et al. | |
| 7,209,970 B1 | 4/2007 | Everson et al. | |
| 7,210,141 B1 * | 4/2007 | Nathan et al. | ................. 717/168 |
| 7,225,462 B2 | 5/2007 | Bass et al. | |
| 7,278,059 B2 | 10/2007 | Hughes | |
| 7,600,219 B2 * | 10/2009 | Tsantilis | ........................ 717/122 |
| 7,634,770 B2 * | 12/2009 | Roth | .............................. 717/170 |
| 8,166,492 B2 * | 4/2012 | Fathalla | ........................ 719/331 |
| 8,332,817 B2 | 12/2012 | Li et al. | |
| 8,364,164 B2 | 1/2013 | Phatak et al. | |
| 8,719,808 B1 | 5/2014 | Prinzing | |
| 2002/0026631 A1 | 2/2002 | Barritz | |
| 2004/0015870 A1 | 1/2004 | Arbouzov et al. | |
| 2004/0044996 A1 * | 3/2004 | Atallah | ........................ 717/169 |
| 2004/0054946 A1 | 3/2004 | Atallah et al. | |
| 2004/0054988 A1 | 3/2004 | Atallah et al. | |
| 2004/0181790 A1 * | 9/2004 | Herrick | ...................... G06F 8/60 717/168 |
| 2005/0065932 A1 | 3/2005 | Rocha et al. | |
| 2005/0071662 A1 * | 3/2005 | Wada | ...................... G06F 21/79 713/193 |

(Continued)

OTHER PUBLICATIONS

Chakrabarti et al., "Interface Compatibility Checking for Software Modules," Computer Aided Verification 14th International Conference, CAV 2002 Copenhagen, Denmark, Jul. 27-31, 14pg.*

(Continued)

*Primary Examiner* — Ryan Coyer
(74) *Attorney, Agent, or Firm* — Lowenstein Sandler LLP

(57) ABSTRACT

A version compatibility method may identify an interface provided by a first version of an operating system and identify an interface provided by a second version of the operating system. A monitoring module generates difference information between the first version and the second version of the operating system. A compatibility module on a host machine determines, using the difference information, whether a computer application program running on the host machine can resolve an interface dependency if an operating system running on the host machine is changed from the first version to the second version.

17 Claims, 8 Drawing Sheets

(56) References Cited

U.S. PATENT DOCUMENTS

| | | |
|---|---|---|
| 2005/0125778 A1 | 6/2005 | Fleegal |
| 2005/0193266 A1 | 9/2005 | Subramanian et al. |
| 2005/0228693 A1 | 10/2005 | Webb et al. |
| 2006/0161910 A1* | 7/2006 | Bonsteel et al. ............... 717/170 |
| 2006/0206890 A1* | 9/2006 | Shenfield .................. G06F 8/20 717/174 |
| 2006/0288344 A1* | 12/2006 | Brodersen et al. ............ 717/168 |
| 2007/0168957 A1* | 7/2007 | Li et al. ......................... 717/120 |
| 2007/0226341 A1 | 9/2007 | Mateo |
| 2007/0250621 A1* | 10/2007 | Hillier ............................ 709/224 |
| 2008/0270996 A1 | 10/2008 | Choi et al. |
| 2010/0138908 A1 | 6/2010 | Vennelakanti et al. |
| 2011/0113409 A1 | 5/2011 | Evans et al. |
| 2012/0185584 A1 | 7/2012 | Pandit |

OTHER PUBLICATIONS

Clarke et al., "Program Compatibility Approaches," Springer-Verlag, 2006, 16pg.*
U.S. Appl. No. 13/009,192, Recording Application Consumption Details, filed Jan. 19, 2011.
U.S. Appl. No. 11/268,487, Certifying a Software Application Based on Identifying Interface Usage, filed Nov. 8, 2005.
"Cheng, Technical guide for porting applications from Solaris to Linux, Version 1.0"; Feb. 12, 2002; URL:http://www.ibm.com/developerworks/eserver/articles/porting_linux/.
"Chu, ""appcert: A Static Application Checking Tool""; Jun. 2001URL:http://developers.sun.com/solaris/articles/appcert.html".
"Debian Project, ""Debian Change log icheck (0. 9. 7-6.1 )"""; Mar. 20, 2005; URL:http://packages.debian.org/changelogs/pool/main/i/icheck/icheck _0. 9.7-6.1/changelog".
Jones, "Deducing an Applications use of API's" Feb. 18, 1997, URL: http://www.knosof.co.uk/apichk.html.
"Subbarao; The Technology Behind LynxOS v4.0's Lunix ABI Compatilibility; Jun. 4, 2004, URL:http://www.lynuxworks.com/products/whitepapers/compatibility.php3".
Sun, Solaris ABI Tools; Dec. 25, 2004, URL: http://web.archive.org/web/20041225005330/http://www.sun.com/software/solaris/programs/abi/.
Sun Microsystems, "A Practical Guide to Adopting the Solaris 8 OS: Part 3"; Jul. 2000; URL:http://developers.sun.com/solaris/articles/solaris8/solaris8_wp3.html.
USPTO; Office Action for U.S. Appl. No. 13/009,192, mailed Dec. 16, 2013.
USPTO; Office Action for U.S. Appl. No. 13/009,192, mailed Jun. 16, 2014.
USPTO; Office Action for U.S. Appl. No. 11/268,487, mailed Dec. 11, 2009.
USPTO; Office Action for U.S. Appl. No. 11/268,487, mailed May 13, 2010.
USPTO; Office Action for U.S. Appl. No. 11/268,487, mailed Sep. 1, 2010.
USPTO; Office Action for U.S. Appl. No. 11/268,487, mailed Feb. 7, 2011.
USPTO; Office Action for U.S. Appl. No. 11/268,487, mailed Oct. 17, 2011.
USPTO; Office Action for U.S. Appl. No. 11/268,487, mailed Apr. 25, 2012.
USPTO; Notice of Allowance for U.S. Appl. No. 11/268,487, mailed Aug. 9, 2012.
"Suffield, ""man icheck (1)—C interface ABI/API checker"""; retrieved Nov. 10, 2009 from URL:http://www.digipedia.pl/man/doc/view/icheck.1.html".
USPTO; Office Action for U.S. Appl. No. 13/009,192, mailed Dec. 15, 2014.
USPTO; Notice of Allowance for U.S. Appl. No. 13/009,192, mailed Dec. 15, 2014.

* cited by examiner

VERSION COMPATIBILITY DETERMINATION

TECHNICAL FIELD

This disclosure relates to the field of computer programs and, in particular, to determining version compatibility from different library interfaces provided by an operating system.

BACKGROUND

An operating system (OS) is software, consisting of programs and data, that runs on processing devices such as computers. The OS manages the computer hardware and provides common services for efficient execution of various computer application software programs. The OS may include a number of libraries accessible to a computer application program running on top of the OS. The libraries may provide, for example, well defined programming sequences that the applications can reuse. Numerous interfaces may exist in the OS to allow the application to access the needed libraries.

Over time, the OS developer may release new verisions of the OS. These new versions (or releases) may include new and/or different libraries or interfaces as compared to previous versions of the OS. In addition, certain librarires or interfaces may be changed and/or removed in the new version of the OS. In certain situations, the OS may be provided by one vendor while the computer application programs may be provided by another vendor. These programs may be referred to as independent software vendor (ISV) applications. In general, the ISV applications, and their creators, may not have access to the source code of the OS. Thus, the ISV applications have no way to tell which OS librarires and interfaces are available in the current OS version. It may be useful for the ISV applications to know which libraries and interfaces are available so that they can determine whether an ISV application will function properly if the OS on a host machine is upgraded or downgraded to a different version.

BRIEF DESCRIPTION OF THE DRAWINGS

The present disclosure is illustrated by way of example, and not by way of limitation, in the figures of the accompanying drawings.

DETAILED DESCRIPTION

Figure 1:
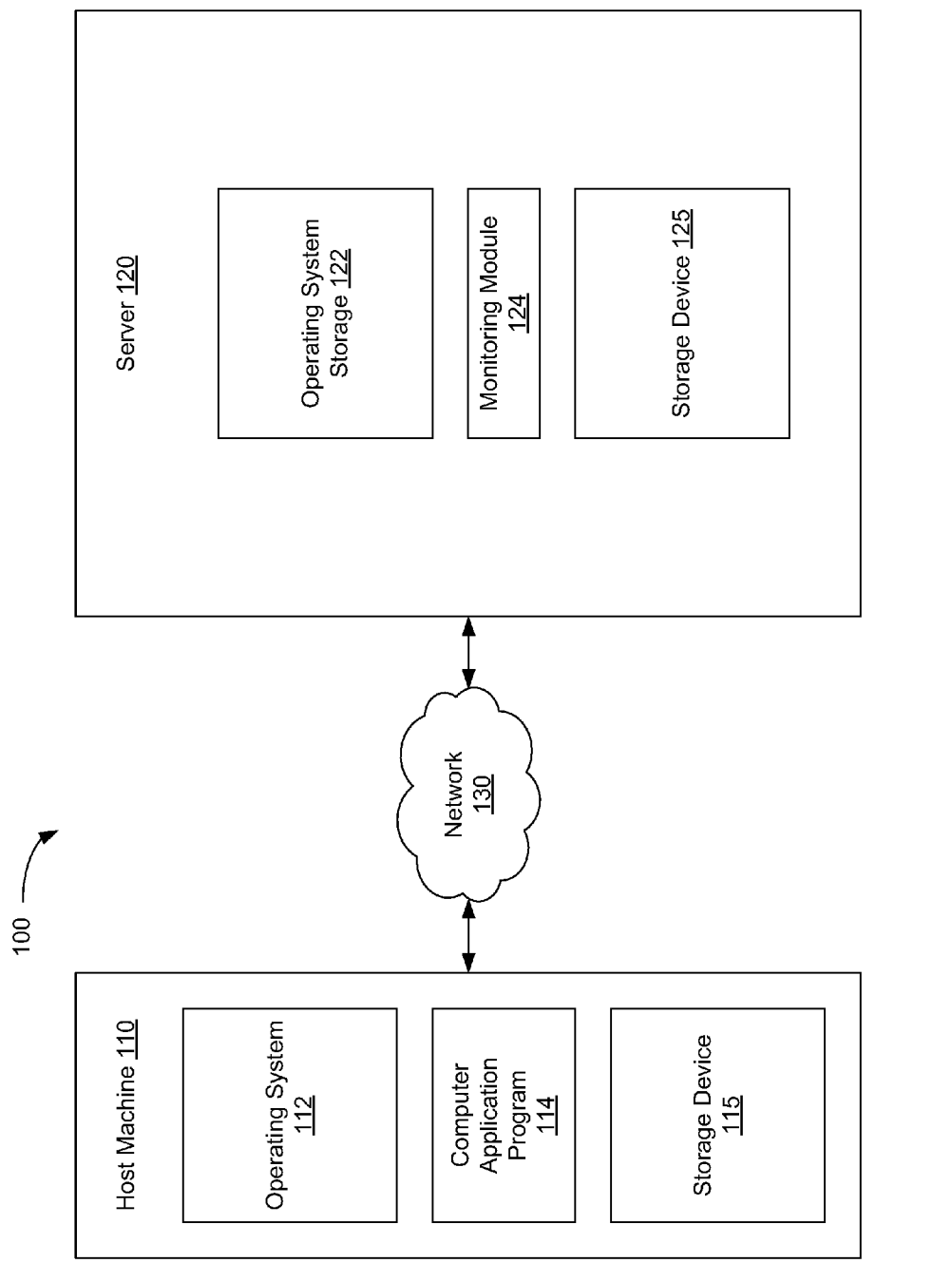
FIG. 1 is a block diagram illustrating a network environment to implement version compatibility determination, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for version compatibility determination. In one embodiment, a monitoring module gathers operating system information for past and present versions (i.e., distribution releases) of an operating system (OS). This information may include a number of libraries and corresponding public interfaces which can be consumed (i.e., used) by a computer application program (e.g., an independent software vendor (ISV) application). Some interfaces that are provided by a library for external consumption are referred to as public or global interfaces. For each public/global interface, prototype information may also be collected. The prototype information may include a definition of the function of the interface and may provide information about syntax and parameters used to make a call to the corresponding interface. The monitoring module may use the collected information to generate a list containing newly added interfaces and any old deleted interfaces for each library between two consecutive releases of the OS. In addition, information may be collected (usually from a maintainer group/individual) for possible alternatives available for missing interfaces in the next release of same library which provides that interface. Information may also be collected about deprecated interfaces for all libraries in all releases.

Once all of the above information has been collected, the monitoring module may create difference information indicating changes between interfaces to libraries which have happened over different releases. This difference information may include library names mapped to newly added interfaces and/or old deleted interfaces. The difference information may be stored in a data structure in memory and compress it into an application package. The application package may also include software programs which may be used on a host machine for calculations once the package main command is invoked. This package may be used when the user of a host system (i.e., a system running one version of the OS) wants to upgrade (or downgrade) to a different version of the OS or wants to check whether an ISV application will be compatible with any other version of the OS. The package may be shipped with installable media or provided as an online update to host machines. The package may be invoked automatically when an upgrade is made on host system by a user. It can also be invoked manually by the user.

Upgrading or downgrading a system may normally be done in one of two ways: either using an installer which boots from bootable media (e.g., and optical or magnetic disk) or can be done using application package manager on the running operating system. In both cases, just before the upgrade happens, the monitoring module may identify all third party and ISV applications running on the system. Once that list is ready, the user may be asked to select one or more third party/ISV applications from the list just made for analysis. Once one or more applications which are to be analyzed are selected, input may be taken from user about the release (be it old or new) against which verification is to be done. Using the difference information available in the package (and the helper programs) a compatibility module can deduce whether the ISV application will resolve all interface dependencies against different dependent libraries in the new OS release. In addition, the difference information can provide information about alternative available interfaces available either in the same library or a different library. It can also provide information about deprecated interfaces which would be removed in coming releases.

FIG. 1 is a block diagram illustrating a network environment to implement version compatibility determination, according to an embodiment of the present invention. In one embodiment, network environment 100 includes host machine 110 and server 120. Host machine 110 and server 120 may be connected through a network 130, which may be a local area network (LAN), a wide area network (WAN), a global area network (GAN) such as the Internet, or a combination of such networks. In other embodiments there may be any number of host machines and/or servers in the network environment 100, however, for ease of explanation, network environment 100 will be described with only one host machine 110 and one server 120.

Figure 8:
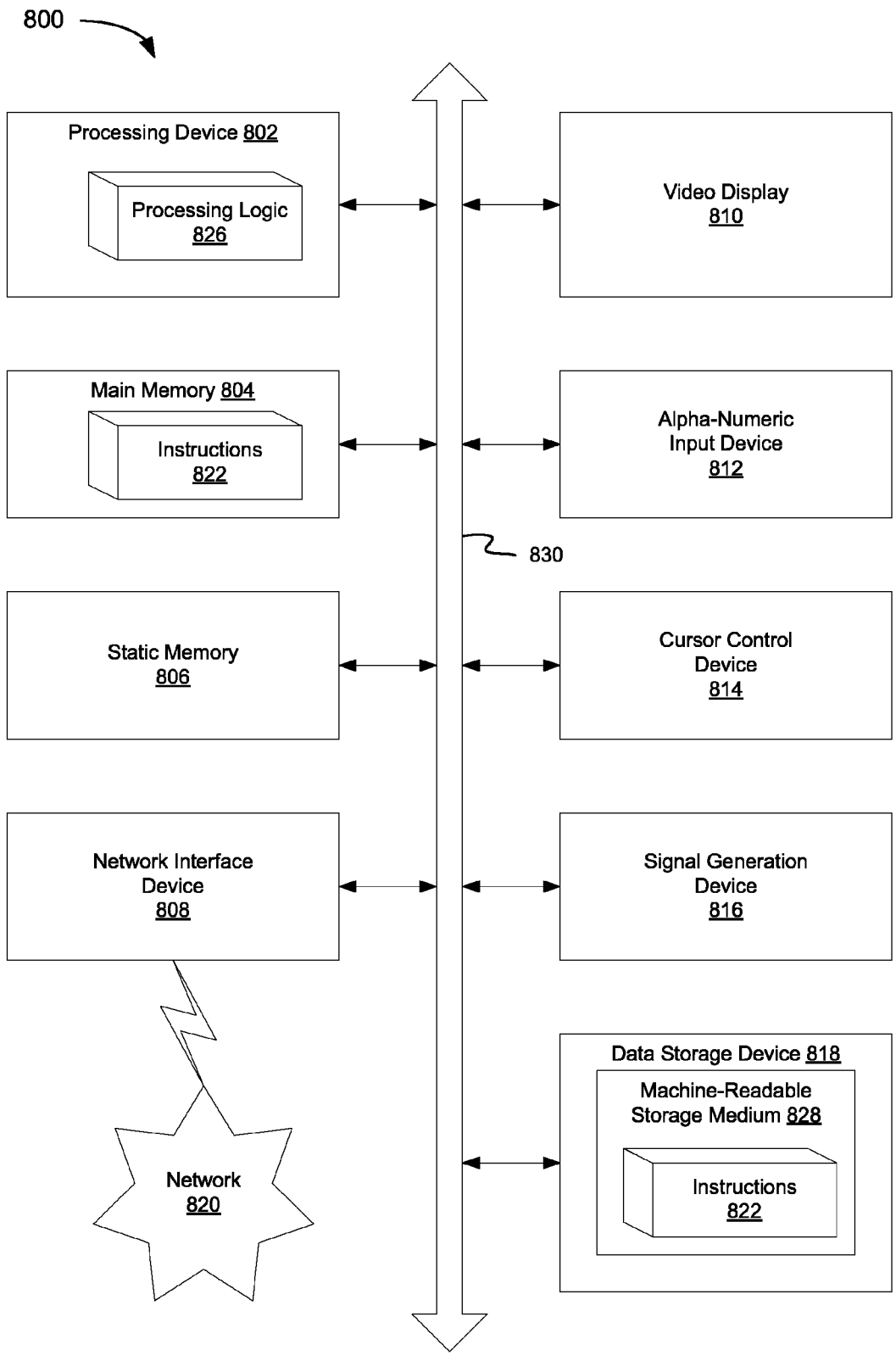
FIG. 8 is a block diagram illustrating one embodiment of a computer system, according to an embodiment.

Each of host machine 110 and server 120 may be, for example, a conventional personal computer (PC), workstation, laptop computer, mobile phone, personal digital assistant (PDA) or the like. Host machine 110 may include a processing device, as illustrated in FIG. 8, which runs an operating system 112 and one or more computer application programs 114. Computer application program 114 may be, for example, any program that runs on top of operating system 112 and may be provided by an independent software vendor (ISV). Computer application program 114 may interact with operating system 112, such as by making use of interfaces and libraries provided by operating system 112.

Host machine 110 may also include a storage device 115. Storage device 115 may be, for example, memory, such as read-only memory (ROM), flash memory, random access memory (RAM), etc., or a mass storage device, such as a magnetic or optical storage device. Storage device 115 may store various information regarding operating system 112 and computer application program 114, such as difference information, as will be described below.

Server 120 may include operating system storage 122. Operating system storage 122 may include one or more different versions of an operating system, where the different versions include changes to the libraries and/or interfaces provided by the operating system. In one embodiment, one of the operating system versions stored in operating system storage 122 is the same version as operating system 112 running on host machine 110. In addition, server 120 may include monitoring module 124. Monitoring module 124 may gather information regarding the libraries and interfaces provided by the various OS versions in operating system storage 122. Server 120 may also include storage device 125 which may store various information regarding the operating system versions in operating system storage 122, such as difference information, as will be described below.

Figure 2:
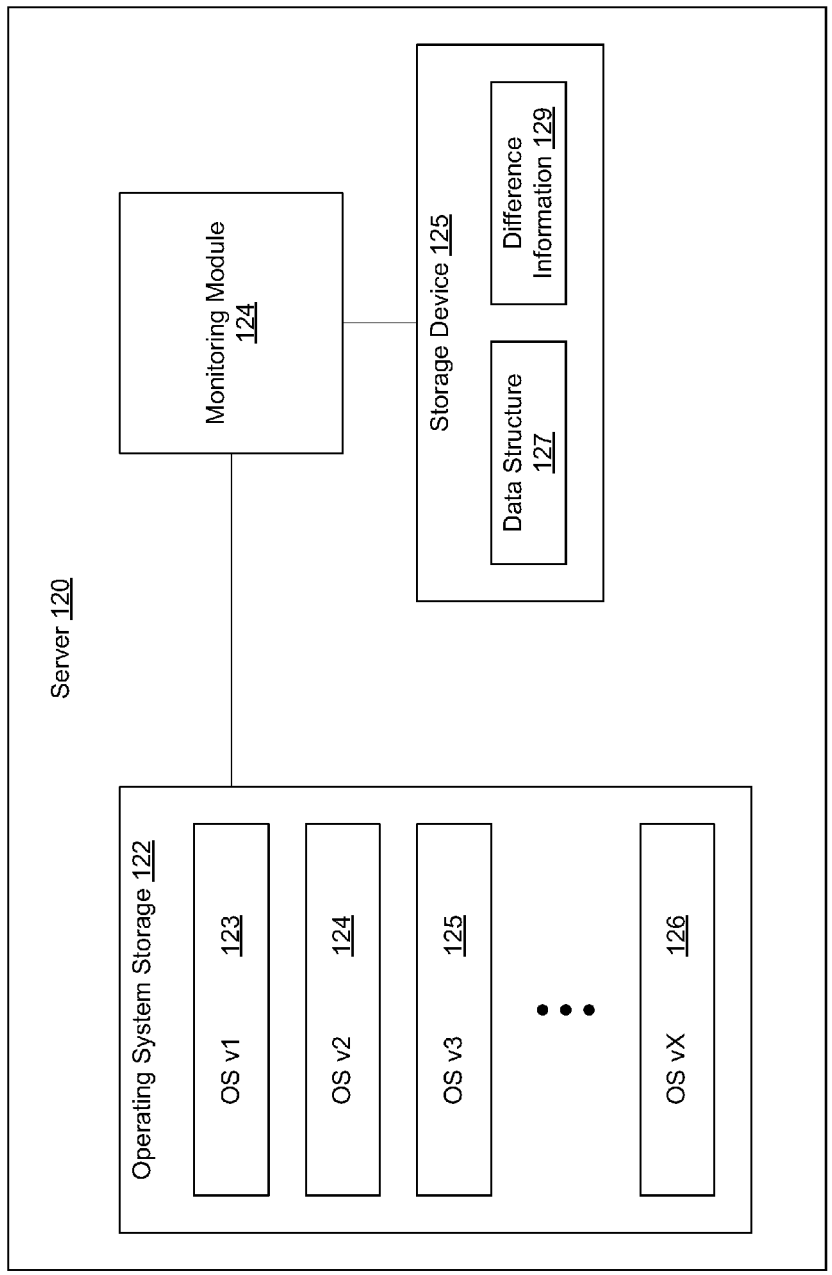
FIG. 2 is a block diagram illustrating a server for implementing version compatibility determination, according to an embodiment.

FIG. 2 is a block diagram illustrating a server for implementing version compatibility determination, according to an embodiment of the present invention. In one embodiment, server 120 may include operating system storage 122. Operating system storage 122 may include a number of different versions 123-126 of a particular operating system (e.g., v1, v2, v3, . . . vX). In one embodiment, operating system storage 122 may include every version of the operating system from the initial release (e.g., v1) to the must recent release (e.g., vX). In other embodiments, the various OS versions 123-126 may be stored externally to server 120, while remaining remotely accessible (e.g., over a network).

Figure 3:
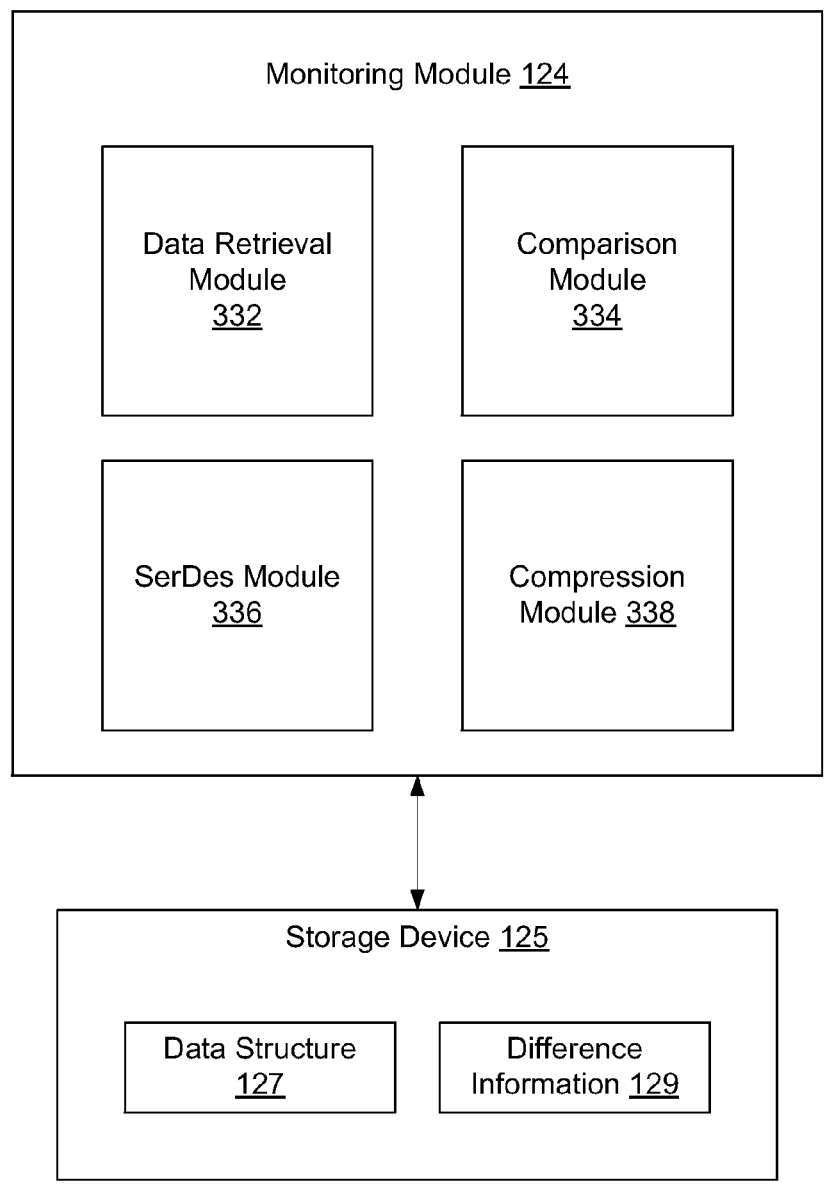
FIG. 3 is a block diagram illustrating a compatibility module for version compatibility determination, according to an embodiment.

Server 120 may additionally include monitoring module 124. Monitoring module 124 may gather information regarding the libraries and interfaces provided by the various OS versions 123-126 in operating system storage 122. FIG. 3 is a block diagram illustrating monitoring module 124, according to an embodiment of the present invention. In one embodiment monitoring module 124 may include data retrieval module 332, comparison module 334, serializer/deserializer (SerDes) module 336, and compression module 338. In one embodiment, monitoring module 124 may be coupled to storage device 125, including data structure 127 and difference information 129.

Data retrieval module 332 may gather a list of files about the interfaces provided by different libraries on different releases of the operating system and identify a specific file type (e.g., ELF files) by a known sequence stored in a header section of each file. Data retrieval module 332 may extract information from the files and may store the extracted information in a data structure 127 on a storage device 125. Comparison module 334 may compare the files in data structure 127 pertaining to different versions of the operating system. SerDes module 336 may serialize the data from data structure 127 into a file and compression module 338 may compress the file using any known compression technique. Further details of monitoring module 124 may be described below with reference to FIGS. 2 and 3.

In order to gather information about the interfaces provided by different libraries on different releases of the operating system, monitoring module 124 may examine the package files of the OS. For each release (i.e., version), information extraction from packages may be performed by data retrieval module 332. All packages belonging to a release or version may be kept at same location in operating system storage 122, separated from other release packages. For a single release, all packages belonging to different architectures may also be separated within that same location. For each release, data retrieval module 332 may loop through all architectures, and for each architecture, loop through the packages to extract the information.

Monitoring module 124 may be connected to a storage device 125 which stores information about the OS versions, for example, in data structure 127. For storing information, monitoring module 124 may use a number of data structures (e.g., tables or other data structures) including a release table, a package table, a library table and an interface table. The release table may store specific release (or version) information, while the package table stores package information and may include a foreign key. The foreign key may be an entry in the package table and would be helpful in referring back to the release table. The library table may store information on all libraries obtained from package extraction and may include a foreign key with the package table. The interface table may store all of the interface details and may include a foreign key with the library table.

The process of gathering information may be the same for all releases. The release table stores the name and architecture details and in one embodiment, for each release, every architecture which is supported has a corresponding an entry in the release table. In one embodiment, the package table may include the name, version, maintainer details (if available) and a foreign key to the release table. Data retrieval module 332 may populate the table, storing the relevant information for the current package. The library table may include the file name, a logical name (e.g., a "soname"), path, alternative library details, a list of symbolic links to the corresponding library and a foreign key to the package table.

To populate the interface table, data retrieval module 332 may identify a list of all global interfaces exported by a library. In one embodiment, on a GNU/Linux system this list may be found using existing tools. One example is eu-readelf/readelf program from elfutils/binutils, however, in other embodiments, other tools may be used. The interface table may include name, version, prototype, alternative interface details and a foreign key to the library table as its columns. This information may be collected and stored for all global/public interfaces of a library. Once complete, the whole process may be repeated for all libraries and then for all packages which are part of this architecture under a release. Once all of the architecture details are retrieved and stored in data structure 127, the process is again repeated for remaining architectures. Once a release is complete, the process is again repeated for other releases until the information has been collected from all versions of the OS in operating system storage 122.

In addition to collecting information about the libraries and interfaces in each version of the OS in operating storage system 122, information may be collected regarding removed and deprecated interfaces. This information may stored as alternative library details in the library table and as alternative interface details in the interface table. In one embodiment, this alternative information may be obtained from the maintainers of the OS libraries and manually entered into data structure 127. In other embodiments, the information may be obtained from project documentation for OS. In some embodiments, the libraries may have automatic deprecated attribute information attached to each function in their header or code file function declaration, however this may not always be the case. For each library in an architecture under a release, data retrieval module 332 may query the library table of the next release to determine whether any interfaces have been removed.

In an embodiment where some interfaces are found to be missing in a subsequent release and information regarding alternative implementations is available (e.g., either from the maintainer team or via project page), data retrieval module 332 may store that information in the data structure 127. In an embodiment, where a whole library is moved to some other library, data retrieval module may put the corresponding alternate library details under a column in data structure 127 which is also named as alternative library details. A similar process may be performed for deprecated interfaces as well. These steps may be repeated for all architectures of a release, and again for all releases.

Once data structure 127 has been updated with the release information, comparison module 334 may compare the information from each OS version (i.e., release) to generate difference information 129. The difference information can be calculated between all consecutive releases and then assembled into a data file. The data file may include a serialized list, where each element of this list represents a difference between consecutive versions of the OS. For example if OS versions 1.0, 1.1, 1.2 and 1.3 are releases of a distribution, then the data file may have following structure: [[Diff between 1.0 and 1.1], [Diff between 1.1 and 1.2], [Diff between 1.2 and 1.3]]. Each of these elements may also be a list of differences between the releases for each architecture that is supported for both releases. For example if A, B, C are architectures supported for both releases, then: [Diff between 1.0 and 1.1]=[[Diff between 1.0 and 1.1 for arch A], [Diff between 1.0 and 1.1 arch B], [Diff between 1.0 and 1.1 for arch C]]. Each element of this list may include information about changes in a particular library. For example: [Diff between 1.0 and 1.1 for arch A]=[[lib1 changes], [lib2 changes], . . . [libn changes]], where n is the number of libraries. Each library change may have values associated with the library, such as, path, library name, soname, etc. The library change may also have a list of symbols removed and list of symbols added, for example: [libn changes]= [path, file name, soname, next release alternative library details, [symbolic links], [to be removed symbol details], [newly added symbols details], [list of deprecated symbols details]].

Once these lists are created, SerDes module 336 may serialize the data, and store it on storage device 125 as a file for difference information 129. Compression module 338 may compress the difference information 129 using known compression techniques and pack the data file into an installable package. This package may be pushed to online repositories or shipped into bootable media. Host machines, such as host machine 110, can then access the package in order to make a version compatibility determination.

Figure 4:
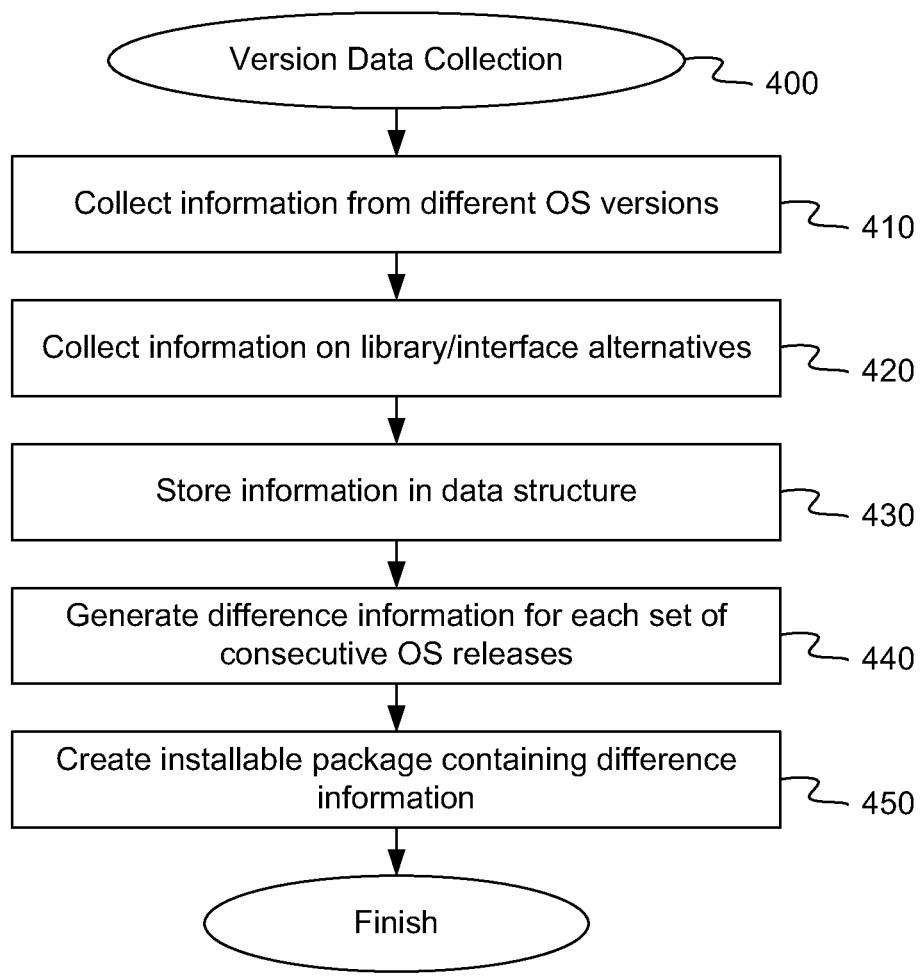
FIG. 4 is a flow diagram illustrating a version data collection method, according to an embodiment.

FIG. 4 is a flow diagram illustrating a version data collection method, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 collects information from various versions or releases of an operating system. In one embodiment, method 400 may be performed by monitoring module 124, as shown in FIGS. 2 and 3, which may be running in server 120.

Referring to FIG. 4, at block 410, method 400 collects information from the different OS versions. Data retrieval module 332 of monitoring module 124 may retrieve data from OS versions 123-126 in operating system storage 122. At block 420, method 400 collects information on library or interface alternatives. Data retrieval module 332 may identify the alternatives if they are stored with the interfaces, otherwise the alternatives may be manually obtained. At block 430, method 400 stores the information collected at blocks 410 and 420 in a data structure, such as data structure 127 in storage device 125.

At block 440, method 400 generates difference information for each set of consecutive OS releases by comparing version information in data structure 127. Comparison module 334 may compare the version information from two consecutive OS versions and identify differences in the interfaces and libraries between the two versions. The differences may be stored in a data file, such as difference information 129, which is serialized by SerDes Module 336. At block 450, method 400 creates an installable package containing the difference information 129. Compression module 338 may compress the difference information 129 using known compression techniques and pack the data file into an installable package, which may be pushed to online repositories or shipped into bootable media for later use by host machines.

Figure 5:
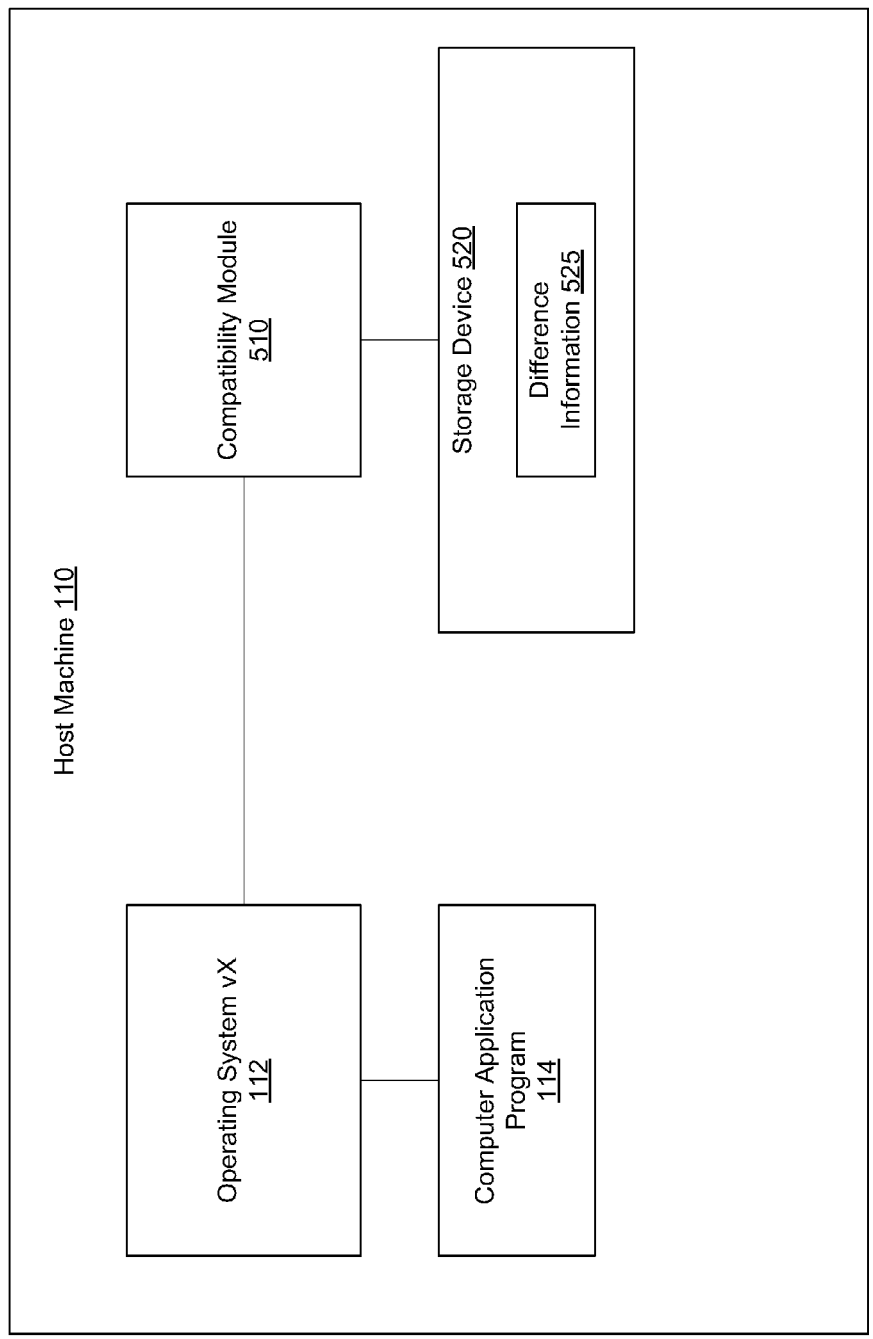
FIG. 5 is a block diagram illustrating a host machine for implementing version compatibility determination, according to an embodiment.

FIG. 5 is a block diagram illustrating a host machine for implementing version compatibility determination, according to an embodiment of the present invention. In one embodiment, server 110 may include operating system 112. Operating system 112 may be one of the different versions 123-126 of the operating system from server 120 (e.g., vX). In one embodiment, host machine 110 may additionally include one or more computer application programs 114 which may be provided by an independent software vendor (ISV) and may interact with operating system 112, such as by making use of interfaces and libraries provided by operating system 112.

Server 120 may additionally include compatibility module 510. Compatibility module 510 may invoke the installable package containing difference information 525 from storage device 520, and use the difference information 525 to decide whether computer application program 114 can resolve all interface dependencies on a different version of operating system 112.

Figure 6:
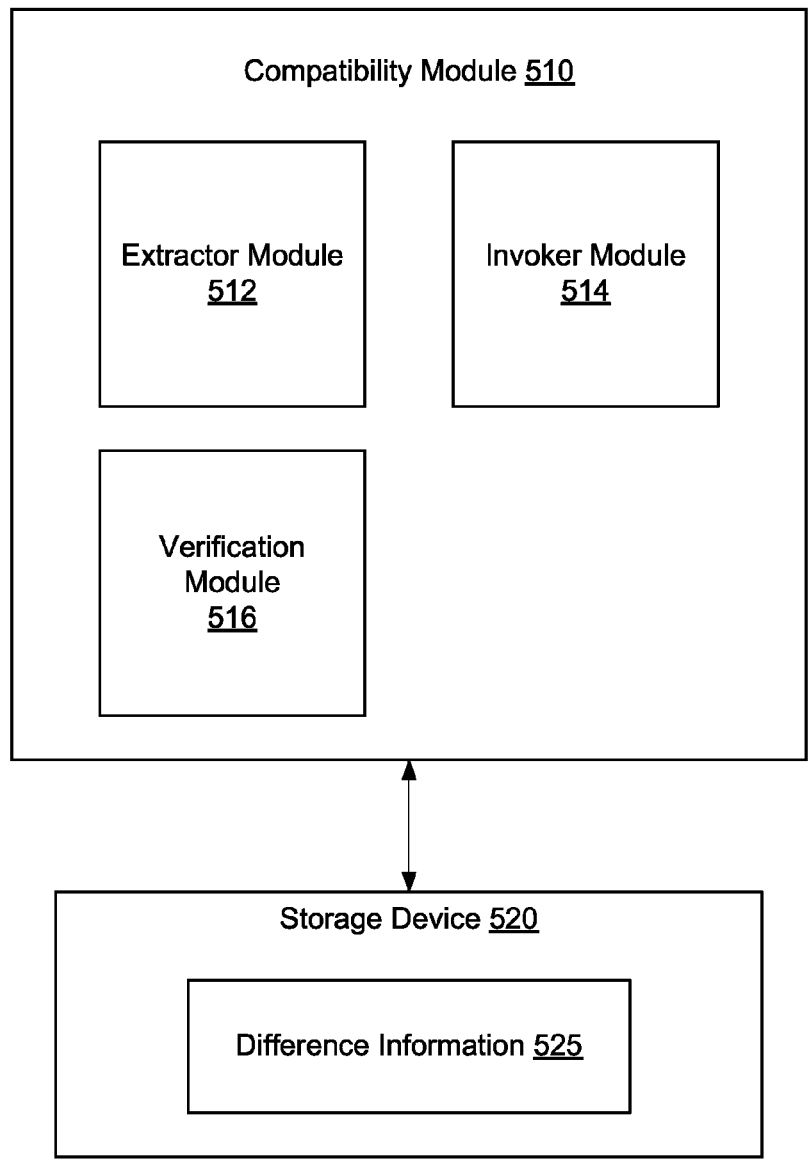
FIG. 6 is a block diagram illustrating a compatibility module for version compatibility determination, according to an embodiment.

FIG. 6 is a block diagram illustrating compatibility module 510, according to an embodiment of the present invention. In one embodiment compatibility module 510 may include extractor module 512, invoker module 514, verification module 516. In one embodiment, compatibility module 510 may be coupled to storage device 520, including data structure difference information 525.

Extractor module 512 may extract the information on the differences between OS versions from the installable package, and store the information as difference information 525. Invoker module 514 may invoke the package data in response to a number of situations. The package may be invoked when the operating system 112 on host machine 110 is being upgraded or downgraded to a different version or when computer application program 114 is being tested against a different version of the operating system. Verification module 516 uses the difference information 525 to determine whether computer application program 114 would be able to resolve all its interface dependencies on a different OS version. Further details of compatibility module 510 may be described below with reference to FIGS. 5 and 6.

In order to resolve the interface dependencies, for each computer application program 114, verification module identifies all application program files (e.g., executable and linkable format (ELF) files, Portable Executable (PE) files, Mach Object (Mach-O) files, or other files). For GNU/Linux derivative systems this may be done using a program called file. The initial bytes of an ELF file format may be used to recognize the file type. In one embodiment, the first four bytes of an ELF file may have known values, such as for example 0x7f, 0xE, 0xL and 0xF, respectively. For each file belonging to computer application program 114, verification module 516 may check the file format and collect a list of all files which have the desired formats. Verification module 516 may loop through each application program file, identify all needed libraries used by computer application program 114 and identify all undefined symbols (along with symbol version information if available) which are resolved with libraries provided by operating system 112. In addition to the libraries provided by operating system 112, these libraries could be libraries from the application itself or from a third party.

In one embodiment, where computer application program 114 is currently running on OS version X.Y and is being upgraded to version X.Y+1, verification module 516 may located an entry in difference information 525 for "Diff between X.Y to X.Y+1." There may be a specific entry for the corresponding architecture (e.g., arch A). Verification module 516 may check to see if there is an entry for needed libraries. If verification module 516 does not find an entry for any of the needed libraries in difference information 525 entry "Diff between X.Y to X.Y+1 for A" then it can be assumed that all dependencies would be resolved unless libraries provided by a third party have changed. This means that if no entry for required libraries are found in difference information 525 regarding any libraries, all interfaces consumed from the operating system will be resolved. There may be a case though were all interfaces consumed by the application itself and a third party change but all interfaces provided by operating system 112 are resolved. In that case application would not be able to run.

In one embodiment, entries corresponding to certain needed libraries are found in difference information 525 for entry "Diff between X.Y to X.Y+1 for A". Suppose, for example, libn is the needed library. Now "libn changes" is an entry in difference information 525. The entry "Diff between X.Y to X.Y+1 for A", may include a list, [path, file name, soname, next release alternative library details, [symbolic links], [to be removed symbol details], [newly added symbols details], [list of deprecated symbols details]], as described above. In order to resolve the dependency, two things may be checked. In "next release alternative library details" compatibility module 510 may check whether the library would be removed in the next release or not. If so, then the application would fail to run on next release because this library would be missing. Alternative details may contain details about alternatives available for this library. If the library is not removed (as is clear from "next release alternative library details" entry) verification module 516 may loop through all symbol entries in the "to be removed symbol details" entry. Verification module 516 may determine whether any symbols in "to be removed symbol details" match the undefined symbols collected from the application. Along with the symbol name, verification module 516 may also match symbol version information if available (which may be know by verification module 516 while collecting symbol information). If the symbols don't match, then applications will be able to resolve all symbols. In case the symbols do match, then verification module 516 may check for alternative information. Alternative information can have information about whether the symbol is deprecated or removed. In case it gets removed, alternative information may be available. Verification module 516 may repeat this process for all needed libraries.

In an embodiment, where the host machine 110 wants to infer whether computer application program 114 could run under an OS version which is more then one level forward or more then one level backward, this process may be performed for all intermediate differences from an initial release until the most recent release.

Figure 7:
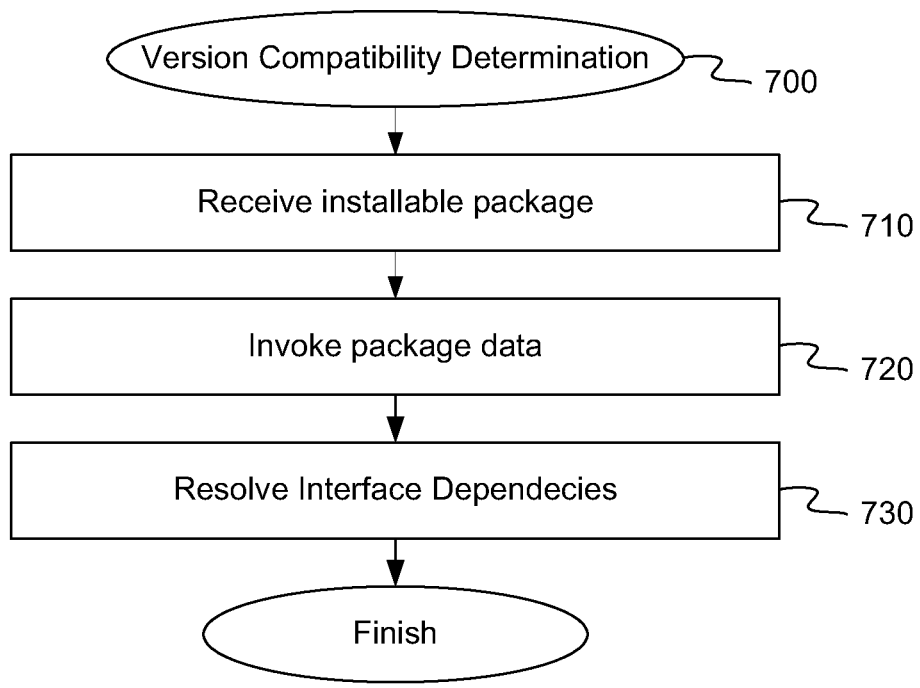
FIG. 7 is a flow diagram illustrating a version compatibility determination method, according to an embodiment.

FIG. 7 is a flow diagram illustrating a version compatibility determination method, according to an embodiment. The method 700 determines whether a computer application program will be compatible with a different version of the operating system on a host machine. In one embodiment, method 700 may be performed by compatibility module 510, as shown in FIGS. 5 and 6, which may be running in host machine 110.

Referring to FIG. 7, at block 710, method 700 receives the installable package. The package may be provided by server 120 and may be receive through an online repository or through bootable media. At block 720, method 700 invokes the received package data. Invoker module 514 may invoke the package by issuing a known command. The package may be invoked in response to a request to change the version of the operating system on the host machine or in response to a request to determine if a computer application program would be compatible with a different version of the operating system. At block 730, method 700 resolves interface dependencies for a computer application program 114. Verification module 516 may identify needed libraries and match them to the interfaces provided by the different versions of the operating system. This may allow verification module 516 to determine whether a computer application program running on the host machine can resolve an interface dependency if the operating system running on the host machine is changed to a different version.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine (e.g., a host machine) in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808.

The machine-readable storage medium 828 may also be used to store instructions to perform a method for version compatibility determination, and/or a software library containing methods that call the above applications. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
    receiving, at a host machine, an installable package, the installable package comprising difference information describing differences between a plurality of versions of an operating system, the difference information comprising a plurality of elements, each element corresponding to differences between corresponding versions of the plurality of versions of the operating system from an original version to a most recent version;
    invoking the installable package; and
    determining, by a processing device using the difference information and in response to an operating system running on the host machine being changed from a first version to a second version, whether a computer application program running on the host machine can resolve an interface dependency, wherein the determining comprises:
        identifying a library provided by the first version of the operating system, the library utilized by the computer application program;

identifying an element, of the plurality of elements, the element corresponding to differences between the first version and the second version of the operating system; and determining whether the element indicates that an interface for the library has been removed from the second version of the operating system.

2. The method of claim 1, wherein the difference information comprises changes to the interfaces provided by the first version and the second version of the operating system.

3. The method of claim 1, further comprising:
invoking the installable package on the host machine in response to a request to change the operating system running on the host machine from the first version to the second version.

4. The method of claim 1, further comprising:
invoking the installable package on the host machine in response to a request to determine whether the computer application program is compatible with the second version of the operating system.

5. The method of claim 1, wherein the computer application program is an independent software vendor (ISV) application.

6. The method of claim 1, wherein the installable package is received through an online repository.

7. A system comprising:
a memory; and
a processing device operatively coupled to the memory, the processing device to:
receive, at a host machine, an installable package, the installable package comprising difference information describing differences between a plurality of versions of an operating system, the difference information comprising a plurality of elements, each element corresponding to differences between corresponding versions of the plurality of versions of the operating system from an original version to a most recent version;
invoke the installable package; and
determine, using the difference information and in response to an operating system running on the host machine being changed from a first version to a second version, whether a computer application program running on the host machine can resolve an interface dependency, wherein to determine, the processing device to:
identify a library provided by the first version of the operating system, the library utilized by the computer application program;
identifying an element, of the plurality of elements, the element corresponding to differences between the first version and the second version of the operating system; and
determine whether the element indicates that an interface for the library has been removed from the second version of the operating system.

8. The system of claim 7, wherein the difference information comprises changes to the interfaces provided by the first version and the second version of the operating system.

9. The system of claim 7, wherein the processing device is further to:
invoke the installable package on the host machine in response to a request to change the operating system running on the host machine from the first version to the second version.

10. The system of claim 7, wherein the processing device is further to:
invoke the installable package on the host machine in response to a request to determine whether the computer application program is compatible with the second version of the operating system.

11. The system of claim 7, wherein the computer application program is an independent software vendor (ISV) application.

12. The system of claim 7, wherein the installable package is received through bootable media.

13. A non-transitory machine-readable storage medium storing instructions which when executed cause a processing device to:
receive, at a host machine, an installable package, the installable package comprising difference information describing differences between a plurality of versions of an operating system, the difference information comprising a plurality of elements, each element corresponding to differences between corresponding versions of the plurality of versions of the operating system from an original version to a most recent version;
invoke the installable package; and
determine, by the processing device using the difference information and in response to an operating system running on the host machine being changed from a first version to a second version, whether a computer application program running on the host machine can resolve an interface dependency, wherein to determine, the processing device to:
identify a library provided by the first version of the operating system, the library utilized by the computer application program;
identify an element, of the plurality of elements, the element corresponding to differences between the first version and the second version of the operating system; and
determine whether the element indicates that an interface for the library has been removed from the second version of the operating system.

14. The storage medium of claim 13, wherein the difference information comprises changes to the interfaces provided by the first version and the second version of the operating system.

15. The storage medium of claim 13, the instructions further to cause the processing device to:
invoke the installable package on the host machine in response to a request to change the operating system running on the host machine from the first version to the second version.

16. The storage medium of claim 13, the instructions further to cause the processing device to:
invoke the installable package on the host machine in response to a request to determine whether the computer application program is compatible with the second version of the operating system.

17. The storage medium of claim 13, wherein the computer application program is an independent software vendor (ISV) application.

* * * * *